United States Patent
Jördens et al.

(10) Patent No.: US 9,560,724 B2
(45) Date of Patent: Jan. 31, 2017

(54) DUAL ENCODER

(71) Applicant: MA LIGHTING TECHNOLOGY GmbH, Waldbuttelbrunn (DE)

(72) Inventors: Roland Jördens, Lohr (DE); Michael Adenau, Würzburg (DE)

(73) Assignee: MA LIGHTING TECHNOLOGY GMBH, Waldbuttelbrunn (DE)

( * ) Notice: Subject to any disclaimer, the term of this patent is extended or adjusted under 35 U.S.C. 154(b) by 0 days.

(21) Appl. No.: 14/868,011

(22) Filed: Sep. 28, 2015

(65) Prior Publication Data

US 2016/0138943 A1    May 19, 2016

(30) Foreign Application Priority Data

Nov. 18, 2014 (DE) .................. 10 2014 116 827

(51) Int. Cl.
  *H03M 11/00*  (2006.01)
  *H05B 37/02*  (2006.01)
  *G01D 5/34*  (2006.01)
  *G01D 5/14*  (2006.01)
  *H01H 19/14*  (2006.01)

(52) U.S. Cl.
  CPC .......... *H05B 37/0254* (2013.01); *G01D 5/142* (2013.01); *G01D 5/34* (2013.01); *H01H 19/14* (2013.01); *H05B 37/0209* (2013.01)

(58) Field of Classification Search
  CPC ...... H03M 1/308; H03M 1/305; H03M 11/04; H03M 11/08; H03M 11/10; H03M 11/24; H03M 1/06; H03M 1/1066; H03M 1/143; H03M 1/161; H03M 1/24; H03M 1/245; H03M 1/26; H03M 1/282; H03M 1/285
  USPC .............................. 341/13, 15–17, 31, 32, 35
  See application file for complete search history.

(56) References Cited

U.S. PATENT DOCUMENTS

| | | | |
|---|---|---|---|
| 4,338,517 A | * | 7/1982 | Perrine ................ G01D 5/3473 250/231.13 |
| 4,523,175 A | | 6/1985 | Sakurai |
| 4,697,168 A | * | 9/1987 | Baker ..................... G01L 3/109 341/15 |

(Continued)

FOREIGN PATENT DOCUMENTS

| | | |
|---|---|---|
| DE | 33 36 746 A1 | 2/1984 |
| DE | 199 22 638 A1 | 11/2000 |

(Continued)

*Primary Examiner* — Linh Nguyen

(74) *Attorney, Agent, or Firm* — Billion & Armitage; Benjamin C. Armitage

(57) ABSTRACT

A dual encoder (07) has a first shaft (09) being mounted in a housing (16) so as to be rotatable, wherein a first locking mechanism, for locking different rotational positions of the first shaft (09), and at least one first rotation signal generator (26, 27), for generating a signal showing a switchover between two locking positions, are provided at the first shaft (09), and having a second shaft (10) being mounted in the housing (16) so as to be coaxially rotatable, wherein a second locking mechanism for locking different rotational positions of the second shaft (10) and at least one second rotation signal generator (28, 29) for generating a signal showing a switchover between two locking positions are provided at the second shaft (10), wherein both shafts (09, 10) include activation elements (11, 12).

18 Claims, 6 Drawing Sheets

(56) References Cited

U.S. PATENT DOCUMENTS

| | | | | |
|---|---|---|---|---|
| 4,920,341 A * | 4/1990 | Aoki | ................ | H03M 1/24 |
| | | | | 324/200 |
| 5,006,848 A * | 4/1991 | Fukumizu | ............ | G01D 5/2451 |
| | | | | 341/13 |
| 5,070,238 A * | 12/1991 | Ishihara | ............... | G01D 5/3473 |
| | | | | 250/231.13 |
| 5,107,107 A * | 4/1992 | Osborne | ............ | G01D 5/34715 |
| | | | | 250/231.14 |
| 5,747,797 A * | 5/1998 | Fujita | ................ | G01D 5/2455 |
| | | | | 250/231.14 |
| 6,445,278 B1 * | 9/2002 | Okumura | ............ | G01D 5/1655 |
| | | | | 338/153 |
| 7,117,609 B2 * | 10/2006 | Mies | ................ | B23F 23/06 |
| | | | | 33/1 PT |
| 8,681,024 B2 * | 3/2014 | Jin | ................ | H03M 1/245 |
| | | | | 341/11 |
| 2013/0242289 A1 * | 9/2013 | Miyajima | ............ | G01D 5/3473 |
| | | | | 356/72 |
| 2016/0116304 A1 * | 4/2016 | Iwamoto | ................ | G01D 5/145 |
| | | | | 324/207.25 |
| 2016/0209241 A1 * | 7/2016 | Mitsuhashi | ............ | G01D 5/145 |

FOREIGN PATENT DOCUMENTS

| | | |
|---|---|---|
| DE | 10 2006 036 636 A1 | 2/2007 |
| FR | 2 908 903 A1 | 5/2008 |

\* cited by examiner

DUAL ENCODER

CROSS-REFERENCE TO RELATED APPLICATION

This application claims benefit of Application No. 10 2014 116 827.5, filed on 23 Oct. 2014 in Germany and which application is incorporated herein by reference. A claim of priority is made.

FIELD OF THE INVENTION

The invention relates to a dual encoder according to the preamble of claim 1.

BACKGROUND OF THE INVENTION

Dual encoders are input apparatuses, which allow users to enter an assigned electrical signal by turning an activation element. Here, dual encoders are characterized in that they do not only include one activation element, for instance a rotary knob or a rotary disk, but two activation elements. Here, both activation elements are connected to a shaft being mounted so as to be rotatable. One rotation signal generator, which is able to directly or indirectly detect a turning of the shaft, is assigned to each shaft. In each instance, the two rotation signal generators then generate an electrical signal after having detected an adjusting movement at the shaft.

Besides, the two shafts are equipped with one locking mechanism in each instance, which mechanism is able to lock the shafts in different rotational positions. In this manner, the signals having been generated by the rotation signal generator can show a switchover between two locking positions by turning the shaft.

For instance, but by no means exclusively, known dual encoders may be used for entering two adjusting values at an appliance, for instance the X value and the Y value in a Cartesian coordinate system, with discrete rates in each instance, with only minor adjusting movements of the hand. From document DE 33 36 746 A1, a simple encoder is known, which is embodied in the manner of a rotary switch. Said encoder has a mechanical locking mechanism, which is able to fix the shaft in different locking positions. Said mechanical locking mechanism has the disadvantage that the mechanical connections of the locking mechanism are subject to relatively high wear, due to which the locking mechanism becomes sluggish or fails completely after a certain running time.

SUMMARY OF THE INVENTION

Starting from this state of the art, it is therefore the object of the present invention to propose a novel dual encoder, whose locking mechanisms work largely without any wear for fixing the rotatable shafts in different rotational positions.

Advantageous embodiments of the invention are the subject-matter of the dependent claims.

The dual encoder in accordance with the invention is based on the fundamental idea that both shafts, wherein users, by hand, put in their adjusting movements at said shafts, are equipped with a magnetic locking mechanism, such that, owing to the fact that the magnetic locking mechanisms function in a noncontact fashion, no substantial wear arises at the locking mechanisms. To be specific, this is achieved in terms of the design in that one locking ring is arranged at each of the two shafts for co-rotation, the locking rings being made of a magnetizable material. Here, radial extensions are in each instance provided at the outer circumference of the two locking rings, such that the outer circumference alternates between a maximum value at the outer end of the radial extensions and a minimum value, namely at the grooves between the radial extensions. This changing outer circumference of the locking ring, for forming a hermetical locking mechanism, is now used in that a magnet is arranged in the housing, being opposite to the radial extensions. If a radial extension is now directly opposite to the magnet, the width of the air gap between the corresponding locking ring and the magnet is at a minimum, such that the holding force being exerted on the locking ring by the magnetic flux of the magnet assumes a maximum value. If, in contrast, a groove of the locking ring is opposite to the magnet, the magnetic flux of the magnet drops due to the locking ring, and the holding force being exerted on the locking ring sinks to a minimum value. In other words, this means that, due to the variation of the width of the air gap between the magnet on the one hand and the locking rings on the other hand, which variation is caused by the variation of the outer circumference of the locking ring with its radial extensions, the magnetic flux being exerted on the locking ring by the magnet can be varied owing to the change in the width of the air gap. Due to said change in the magnetic flux and in the magnetic holding force being exerted thereby, the magnet brings about a locking of the respectively assigned shaft in the housing, the locking depending on the rotational position.

In order to allow for a particularly compact construction of the dual encoder, it is particularly advantageous if the two shafts run coaxially with respect to each other. In order to make this possible, one of the two shafts is embodied in the manner of a hollow shaft, which, with at least one roller bearing, is mounted in the housing of the dual encoder so as to be rotatable. In said hollow shaft, the second shaft, with at least one further roller bearing, is then in turn mounted so as to be rotatable. In this manner, users are able to turn both shafts independently of each other, in order to be able to configure corresponding settings by means of the dual encoder.

A particularly simple and cost-effective structure of the dual encoder results if the two locking rings present the same outer circumference with their radial extensions and if they are arranged, in the direction of the longitudinal axis of the shafts, behind each other in the housing. The magnet for realizing the two locking mechanisms is arranged in the housing of the dual encoder such that it is centrally opposite to the gap between the two locking rings. In this manner, a magnet can simultaneously build up a magnetic flux at both locking rings. For realizing the two locking mechanisms at the two locking rings, a single magnet, which acts on both locking rings at the same time, is therefore already sufficient.

The magnetic holding force of the magnet being utilized in the locking mechanism exerts a magnetic pull on the locking rings, such that a tilting moment in each instance acts on the two shafts. In order to compensate for this tilting moment and in order to thereby prevent wear of the bearing of the shafts, it is particularly advantageous if, for realizing the locking mechanisms, two magnets are in each instance arranged in the housing, mirror-symmetrically with respect to the longitudinal axis of the shafts. In this manner, the tilting moment of the two magnets acts on the shafts with opposite signs, thereby being obliterated as a result. Depending on the function of the dual encoder, it may be desirable for the locking of the two locking mechanisms to present a different locking resistance. Such locking mechanisms having different locking resistances can, in the dual encoder in accordance with the invention, be realized in a simple manner in that at least one magnet is in each instance exclusively assigned to each of the two locking rings, wherein the different magnets act on the locking rings of the two shafts with a different magnetic holding force in each instance. For instance, a small, relatively weak magnet can be assigned to one of the locking rings, in order to realize a weak locking, whereas the second locking ring cooperates with a stronger and larger magnet in order to realize a stronger locking.

It is in principle arbitrary which type of rotation signal generator is employed for detecting the adjusting movements at the two shafts. With regard to a resistance to wear that is as high as possible, it is particularly advantageous if a rotation signal generator that works in a noncontact fashion, in particular a reflective light barrier or a Hall effect sensor, is employed. Here, the design of the dual encoder is simplified considerably if said dual encoder that works in a noncontact fashion detects the adjusting movements of the radial extensions at the locking rings for generating the switchover signal between two locking positions. In other words, this means that the radial extensions at the locking rings do not only serve for forming the magnetic locking mechanism, but are at the same time also used for detecting the adjusting movements at the shafts of the dual encoder.

In different areas of application of dual encoders, it is furthermore important, apart from generating a switchover signal, when adjusting between two locking positions, to also detect the rotational direction of the corresponding shaft. In order to avoid installing a specific rotational direction sensor, two rotation signal generators can be assigned to each of the locking rings. When evaluating the switchover signals of the two rotation signal generators being assigned to one locking ring, phase shifts occur between the switchover signals, which shifts indicate the rotational direction of the assigned locking ring. If one of the rotation signal generators is, for instance, arranged in the housing so as to be slightly offset clockwise with respect to the second rotation signal generator, it can without any problems be detected from the phase shift of the two rotation signal generators in which direction the locking ring rotates.

For specific functions, it is advantageous that, after setting one of the two shafts of the dual encoder, for instance for selecting an X or a Y value, users can select and confirm the corresponding value. Said selection and confirmation of a value having been set at the shafts can in a simple manner be realized in that at least one of the two shafts is mounted so as to be axially adjustable in the direction of its longitudinal axis between a rest position and a switched position. Hence, this means that the shaft is not only mounted so as to be rotatable, but also so as to be axially adjustable. In order to then realize the selection and confirmation of a set value, a switching sensor is additionally provided in the housing, with which sensor the adjustment of the axially adjustable shaft between the rest position and the switched position can be detected. If the users have now set a specific value by turning the shaft, which can be analyzed electronically by evaluating the signals of the rotation signal generator, the users can then push the axially adjustable shaft for a short time and can thereby move it from its rest position into the switched position. This adjustment can then be detected with the aid of the switching sensor, such that the value having been set at the shaft is thus selected and confirmed by the users and can be made available for further electronic processing.

With regard to the resistance to wear of the dual encoder, it is in turn particularly advantageous if the switching sensor is also embodied as a switching sensor that works in a noncontact fashion, in particular as a reflective light barrier or as a Hall effect sensor.

With regard to a simple and reliable signal evaluation of the switching sensor, a signaling disk can additionally be fastened to the axially adjustable shaft. Said signaling disk can be arranged so as to be opposite to the switching sensor that works in a noncontact fashion, said sensor for instance being a reflective light barrier. By adjusting the axially adjustable shaft between its rest position and the switched position, the signaling disk then reaches a position in which the distance between the switching sensor and the signaling disk becomes significantly smaller or larger, in order to thus be analyzable without any problems by the switching sensor working in a noncontact fashion, said sensor for instance being a reflective light barrier or a Hall effect sensor.

In order to realize the function of the dual encoder in connection with an axially adjustable mounting of at least one shaft, it is required that the axially adjustable shaft, under normal circumstances without any effort on the part of the users, is held in its rest position. With regard to an operation of the dual encoder that is as free from wear as possible, this readjusting of the axially adjustable shaft into its rest position can be realized by way of a readjusting magnet. Said readjusting magnet, too, with its readjusting force, acts on the assigned components of the axially adjustable shaft in a noncontact fashion.

With regard to ease of operation and to a wear that is as low as possible, it is besides advantageous if the adjusting movement of the axially adjustable shaft between the rest position and the switched position or vice versa is dampened. Hereunto, a dampening element, for instance a rubber ring, can be utilized, which, in a dampening fashion, may come to rest against a component of the shaft being mounted so as to be adjustable.

The dual encoder in accordance with the invention can be employed for basically any function. The dual encoder offers particularly great advantages when being utilized for entering adjusting commands at a lighting control console, with which lighting elements, for instance stage spotlights, can be controlled and programmed. This is because lighting control consoles have to meet high demands with regard to resistance to wear and reliability. These goals can be correspondingly made allowance for to an improved extent by utilizing the dual encoder in accordance with the invention at lighting control consoles.

With regard to a simple handling when entering values at the inventive dual encoder when programming a lighting control console, it is particularly advantageous if the activation elements are embodied in the manner of rotary knobs or of rotary disks for hand-activated adjustment of the shafts, said knobs or disks being arranged in the control panel of the lighting control console. Here, the two rotary knobs or rotary disks of the dual encoder are arranged one on top of the other in the direction of the longitudinal axis of the shafts and can coaxially be turned in opposite directions, such that users can set both activation elements without any problems solely by moving their fingers.

The inventive magnetically acting locking mechanism at the two shafts of the dual encoder works in a noncontact fashion, such that, when adjusting the shafts, substantially no frictional losses arise. In order to allow for an adjustment of the shafts by way of an angular momentum induced by users at the activation element being assigned in each instance, it is particularly advantageous if the corresponding activation element is equipped with a weight. Due to said weight, it is possible to transmit a greater angular momentum onto the activation element, such that the corresponding shaft of the dual encoder lags behind for a correspondingly long time and allows for a comfortable adjustment over long adjustment paths.

It is in principle arbitrary which type of magnets is utilized for the locking mechanism of the dual encoder. The structure of the locking mechanism can be realized in a particularly simple, reliable and inexpensive fashion when permanent magnets are utilized.

As an alternative to permanent magnets, electromagnets can also be employed in the locking mechanism. By changing or switching off the energy supply of the electromagnet, the magnetic holding force acting in the locking mechanism can be changed depending on its function.

In the drawings, one embodiment of the invention is schematically illustrated and will be explained by way of example in the following.

DETAILED DESCRIPTION OF THE INVENTION

Figure 1:
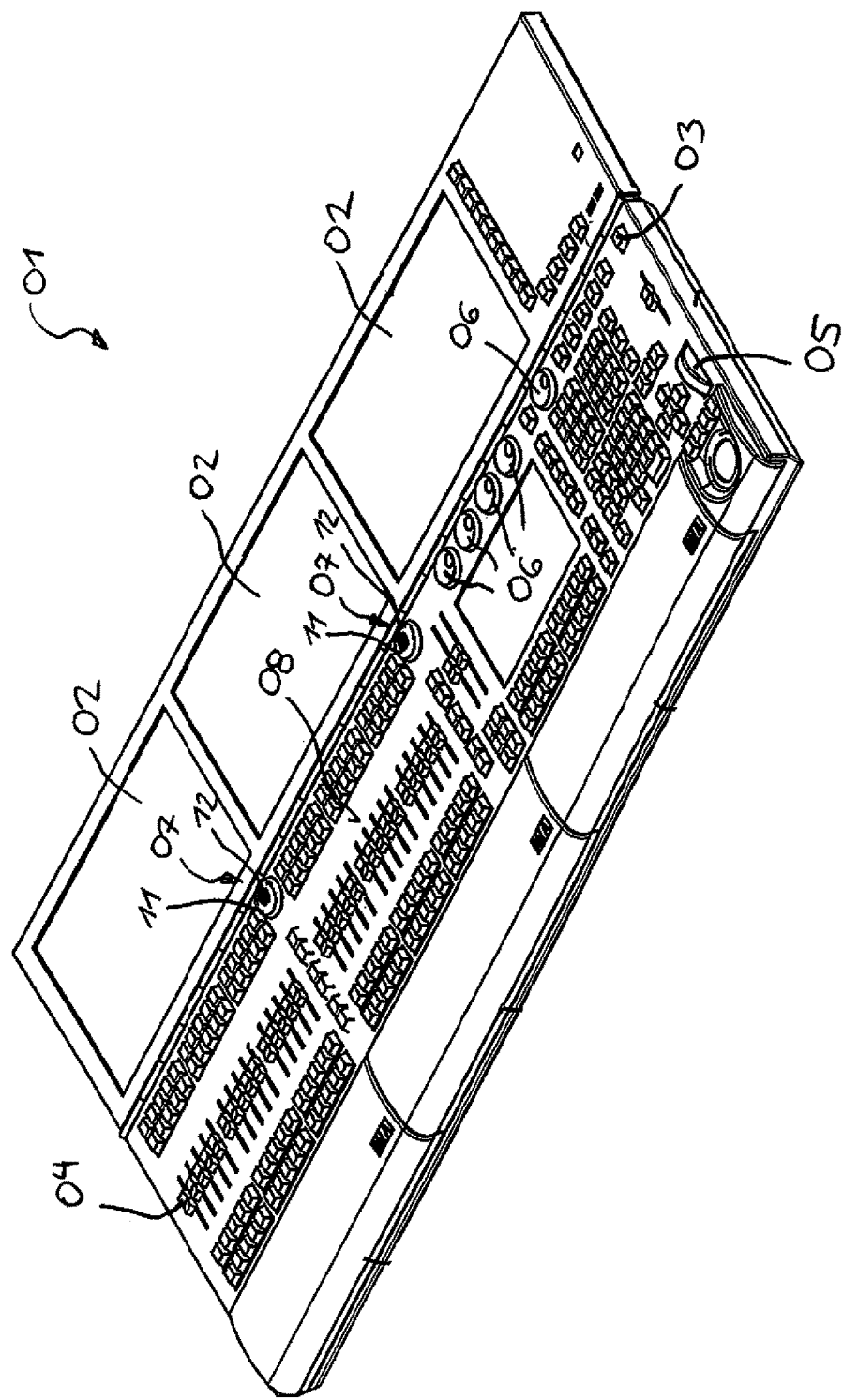
FIG. 1 shows a lighting control console having two dual encoders in a perspective view from above.

In a perspective view, FIG. 1 shows a lighting control console 01 for programming and controlling a stage lighting system. The lighting control console 01 is equipped with three monitors 02 for displaying various menus for users. For entering adjusting commands, a plurality of push buttons 03, slide controls 04 and adjusting wheels 05 is provided at the lighting control console 01. Besides, for entering control commands, the control panel 08 of the lighting control console 01 is fitted with five simple rotary shaft encoders 06 and two dual encoders 07.

Figure 2:
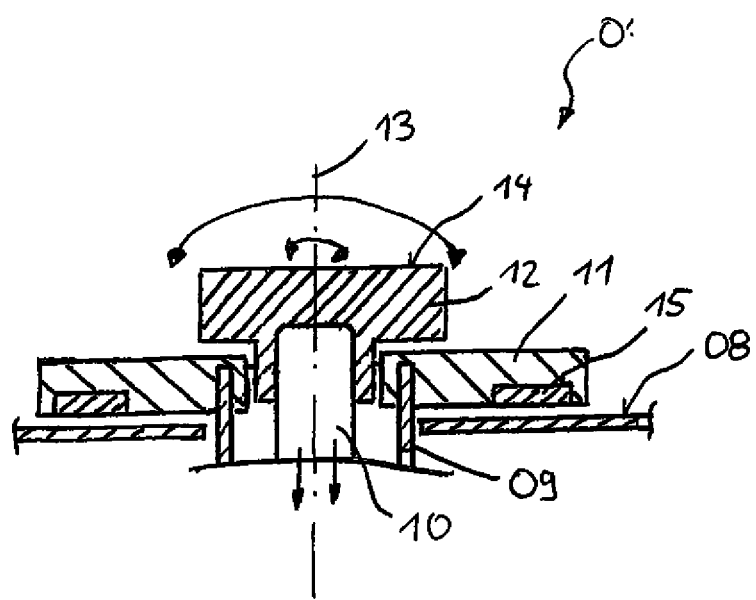
FIG. 2 shows the activation elements at a dual encoder of the lighting control console in accordance with FIG. 1 in a cross-section.

FIG. 2 shows the upper part of a dual encoder 07 in a cross-section. The dual encoder with which the control panel 08 of the lighting control console 01 is fitted includes two shafts being mounted so as to be rotatable, namely a hollow shaft 09 and a central shaft 10 being mounted therein so as to be coaxially rotatable. In FIG. 2, only the upper ends of the hollow shaft 09 and of the central shaft 10 are illustrated. The function of the hollow shaft 09 and of the central shaft 10 is explained below with the aid of the other drawings. Two activation elements, namely a rotary disk 11, with which the hollow shaft 09 can be turned, and a rotary knob 12, with which the central shaft 10 can be turned, are fastened to the upper ends of the hollow shaft 09 and of the central shaft 10.

Through manual activation of the rotary disk 11 or of the rotary knob 12, the hollow shaft 09 and the central shaft 10 can be turned rotatorily about their longitudinal axis 13 independently of each other, in order to thereby enter adjusting commands into the lighting control console 01. Here, the hollow shaft 09 is additionally mounted so as to be axially adjustable in the direction of the longitudinal axis 13, such that users, by pressing onto the upper side 14 of the rotary knob 12, can select and confirm a value having been set by turning the hollow shaft 09. At its bottom side, the rotary disk 11 is equipped with an annular weight 15, which, for instance, may be produced by way of injection of a metal ring into the rotary disk 11 that consists of plastic material. Due to the fact that there is additional weight because of the weight 15, a greater angular momentum can be transmitted onto the rotary disk 11. This gives users the possibility to give momentum to the rotary disk 11 with their fingers and to thereby realize a strong rotary movement of the rotary disk 11.

Figure 3:
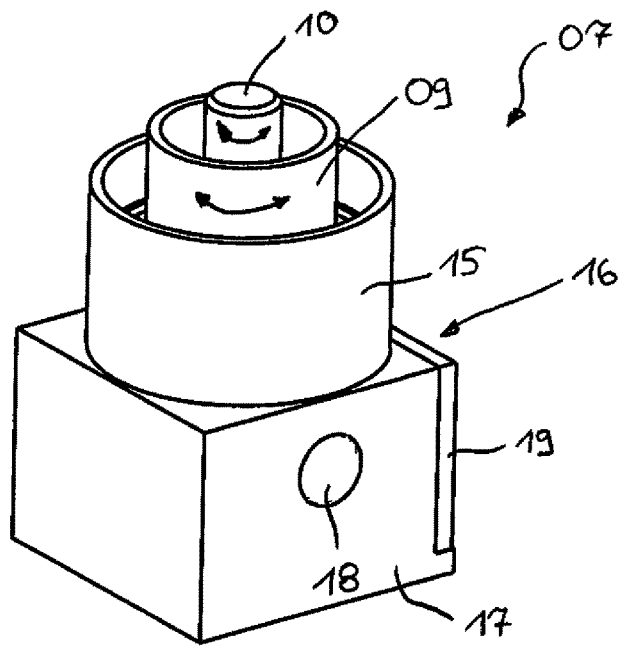
FIG. 3 shows the dual encoder of the lighting control console in accordance with FIG. 1 in a perspective lateral view.

FIG. 3 shows the dual encoder 07 having the shafts 09 and 10 being mounted so as to be rotatable in a perspective lateral view. The hollow shaft 09 is mounted in the cylindrical upper part 15 of the housing 16 so as to be rotatable. The central shaft 10 is mounted in the hollow shaft 09 so as to be rotatable. A rectangular lower part 17 adjoins the upper part 15 of the housing 16, which lower part serves for fastening the magnets of the magnetically acting locking mechanism, namely two permanent magnets 18, and one electronic baseboard 19, on the inner side of which the sensors of the dual encoder 07 are arranged.

Figure 4:
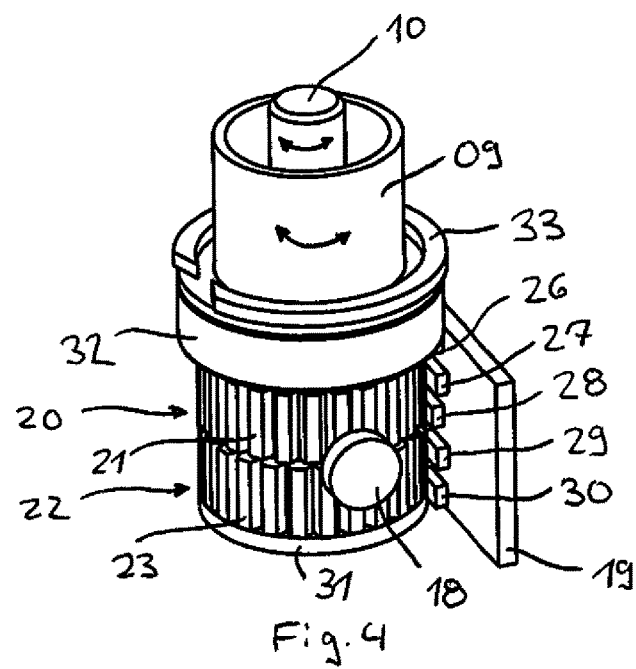
FIG. 4 shows the dual encoder in accordance with FIG. 3 omitting the housing, in a perspective lateral view.
Figure 9:
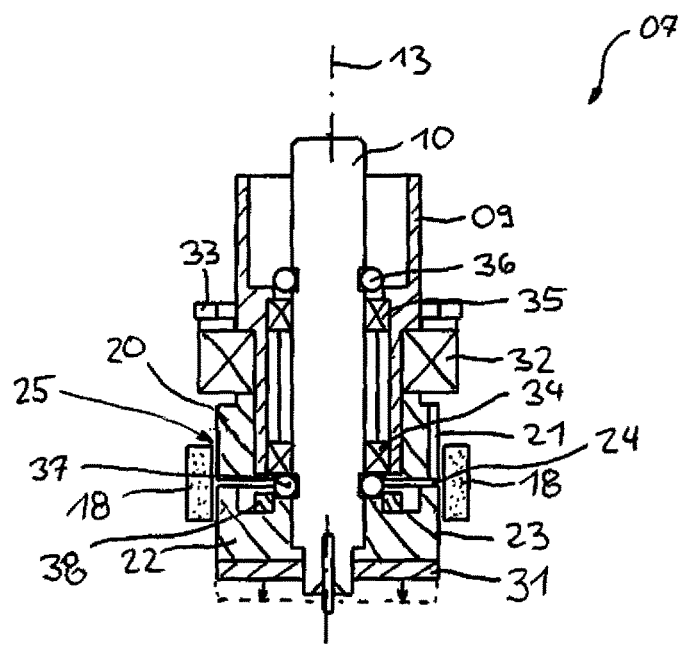
FIG. 9 shows the dual encoder in accordance with FIG. 8 in a cross-section along sectional line II-II.

FIG. 4 shows the dual encoder 07 without the housing 16. A first locking ring 20 is fastened to the hollow shaft 09, at the outer circumference of which locking ring radial extensions 21 extend towards the outside in each instance. A locking ring 22 having radial extensions 23 and being substantially identically constructed is fastened to the central shaft 10. The two locking rings 20 and 22 are located, in the fitting position, directly on top of each other and, for realizing a magnetic locking mechanism, cooperate with the permanent magnet 18 and with a second permanent magnet 18 being attached to the opposite side of the housing 16 in a mirror-symmetrical fashion. The mirror-symmetrical arrangement of the two permanent magnets 18 can be seen from the sectional illustration in FIG. 9. Both permanent magnets 18 are arranged in the housing 16 such that they are centrally opposite to the gap 24 between the two locking rings 20 and 22. In this manner, the two permanent magnets 18 can cooperate both with the radial extensions 21 and with the radial extensions 23 of the two locking rings 20 and 22 for realizing the magnetic locking mechanism. Owing to the change in the outer circumference of the locking rings 20 and 22 corresponding to the height of the radial extensions 21 and 22, the width of the air gap 25 between the permanent magnet 18 on the one hand and the locking rings 20 or 22 on the other hand changes. In a small air gap 25, the permanent magnets 18 bring about a high magnetic flux through the magnetic material of the locking rings 20 and 22 and a correspondingly high locking force. If the air gap 25 is then increased in size by turning the shaft 09 or 10, a reduction in the magnetic locking force follows, such that, as a result, the locking force of the permanent magnets 18, which is exerted on the locking rings 20 and 22, alternates between a force maximum and a force minimum, thereby realizing the desired locking effect at the shafts 09 and 10 of the dual encoder 07.

On the inner side, four rotation signal generators 26, 27, 28 and 29 are fastened and contacted electronically on the baseboard 19. The rotation signal generators 26 to 29 are embodied in the manner of Hall effect sensors and cooperate with the radial extensions 21 or 23 of the locking rings 20 and 22 for detecting the switchover between two locking positions. Here, the rotation signal generators 26 and 27 are assigned to locking ring 20 and the rotation signal generators 28 and 29 are assigned to locking ring 22. By means of the starting signals from the rotation signal generators 26 to 29 and by analyzing the phase shift of rotation signal generator 27 in relation to rotation signal generator 26 or of rotation signal generator 29 in relation to rotation signal generator 28, the adjustment of the locking rings 20 and 22 and the rotational direction can be detected.

Figure 7:
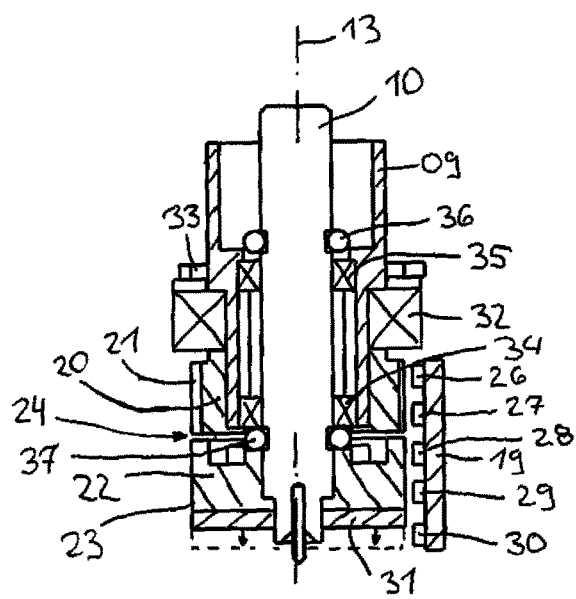
FIG. 7 shows the dual encoder in accordance with FIG. 6 in a cross-section along sectional line I-I omitting the housing surrounding the same.
Figure 8:
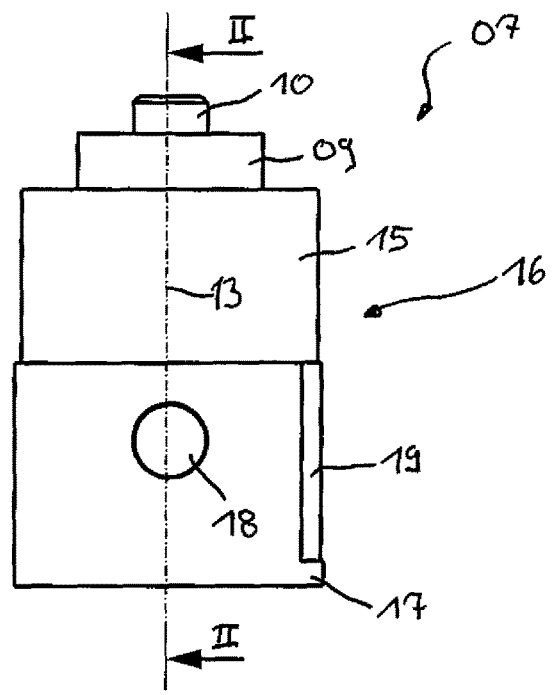
FIG. 8 shows the dual encoder in accordance with FIG. 3 in a second lateral view.

Furthermore, an additional switching sensor 30, which is similarly embodied in the manner of a Hall effect sensor working in a noncontact fashion, is fastened and electronically contacted on the baseboard 19. Here, the switching sensor 30 cooperates with a signaling disk 31, which is fastened to the central shaft 10 beneath the locking ring 22. If the axially adjustable central shaft 10 is in its axial rest position, as it is illustrated in FIG. 7, the signaling disk 31 is located above the switching sensor 30. If users then push axially the central shaft 10 downwards for confirming a previously set value, the central shaft 10 reaches its switched position, in which the signaling disk 31 is directly opposite to the switching sensor 30 (as it is indicated by a dashed line in FIG. 7).

Figure 5:
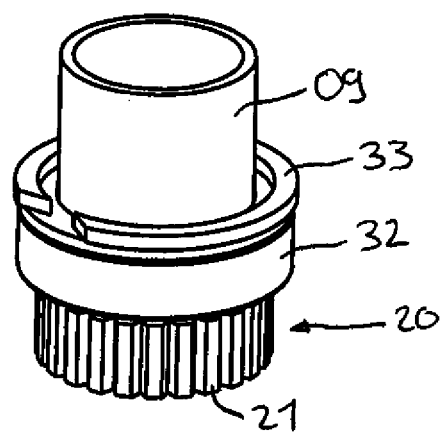
FIG. 5 shows the two shafts of the dual encoder, said shafts being mounted so as to be rotatable, in accordance with FIG. 3 in a perspective exploded drawing.
Figure 5:
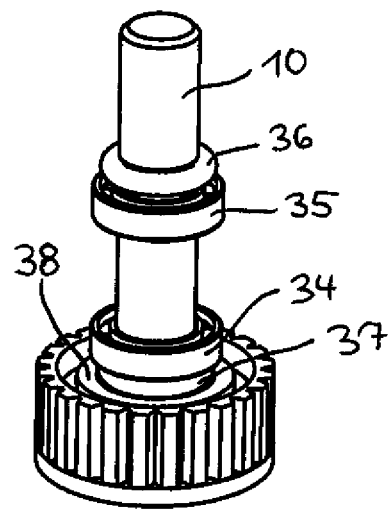
Figure 6:
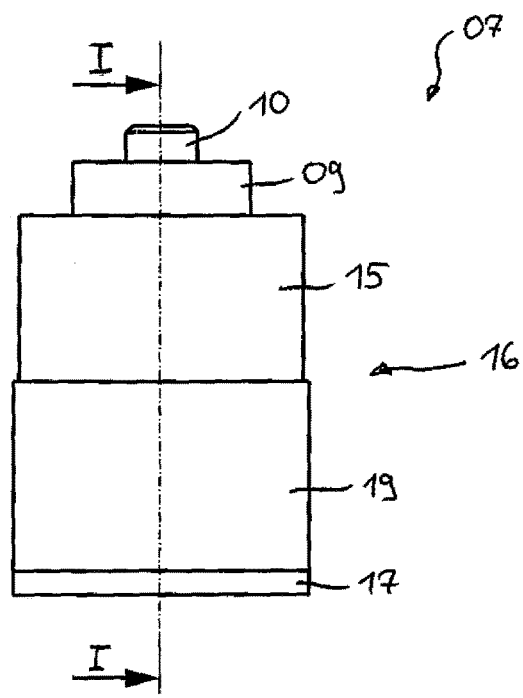
FIG. 6 shows the dual encoder in accordance with FIG. 3 in a first lateral view.

FIG. 5 shows the two shafts 09 and 10 having the locking rings 20 and 22 being fastened thereto in each instance, without the housing 16, in an exploded illustration. By means of a roller bearing 32, the hollow shaft 09 is held in the cylindrical upper part 15 of the housing 16 so as to be rotatable. A snap ring 33 serves for fastening the roller bearing 32 having the hollow shaft 09 in the housing 16.

The central shaft 10, having two roller bearings 34 and 35, is mounted in the inside of the hollow shaft 09 so as to be rotatable and axially adjustable. Two rubber rings 36 and 37 serve for dampening the axial adjusting movement of the central shaft 10. Besides, an annular readjusting magnet 38 is fastened to the upper side of the locking ring 22, the magnetic force of which magnet retracts the central shaft 10 into its rest position being illustrated in FIG. 7. When the users press onto the upper end of the shaft 10, the magnetic holding force of the readjusting magnet 38 is exceeded at a specific threshold and the shaft 10, having the locking ring 22 and the signaling disk 31, is axially adjusted into its switched position being shown in a dashed line.

The invention claimed is:

1. A dual encoder having comprising:
a housing;
a first shaft rotatably mounted in the housing, the first shaft including
a first locking mechanism, for locking different rotational positions of the first shaft, and
at least one first rotation signal generator, for generating a signal showing a switchover between two locking positions of the first shaft, and
a second shaft being rotatably mounted in the housing, the second shaft coaxial with respect to the first shaft, the second shaft including
a second locking mechanism for locking different rotational positions of the second shaft and
at least one second rotation signal generator for generating a signal showing a switchover between two locking positions and
a first activation element associated with the first shaft;
a second activation element associated with the second shaft, the first and second activation elements for transmitting adjusting movements onto the first shaft and the second shaft
a first locking ring arranged at the first shaft
a second locking ring arranged at the second shaft for co-rotation, the first and second locking rings made of a magnetizable material, the first and second locking rings having multiple radial extensions proximate the outer circumference of the first and second locking rings, and
at least one magnet arranged in the housing, opposite to the radial extensions, wherein the width of the air gap between the magnet and the first and second locking rings varies, depending on the rotational position to vary a magnetic holding force and cause locking at different rotational positions of the first and second shafts with respect to the housing, said magnetic holding force depending on the width of the air gap.

2. The dual encoder according to claim 1,
wherein the first shaft is hollow and includes a second roller bearing mounted to the first shaft;
a first roller bearing, mounted in the housing, said first shaft rotatable on the first roller bearing
the second shaft mounted in the hollow shaft so as to be coaxially rotatable on the second roller bearing.

3. The dual encoder according to claim 1,
wherein the first and second locking rings present the same outer circumference and are arranged, in the direction of the longitudinal axis of the shafts, behind each other in the housing, wherein the magnet is arranged in the housing so as to be centrally opposite to the gap between the locking rings, and wherein the magnetic holding force of the magnet simultaneously acts on both locking rings.

4. The dual encoder according to claim 1, wherein
at least two magnets are arranged in the housing symmetrically with respect to a longitudinal axis of the first shaft and the second shaft.

5. The dual encoder according to claim 1, wherein a first magnet acts on the first locking ring with a first magnetic holding force, and a second magnet acts on the second locking ring with a second magnetic holding force, wherein the first magnetic holding force is different than the second magnetic holding force.

6. The dual encoder according to claim 1, wherein the at least one first rotational signal generator and at least one second rotational signal generator works in a noncontact fashion, in particular as reflective light barrier, wherein the adjusting movements of the radial extensions at the locking rings, for generating the switchover signal between two locking positions, can be detected with the aid of the rotation signal generator that works in a noncontact fashion.

7. The dual encoder according to claim 1, wherein at least one of the first rotation signal generators is assigned to the first locking ring, wherein at least one of the second rotation signal generators is assigned to the second locking ring, the rotational direction of the assigned locking ring can be detected from the phase shift of the switchover signal of the first and second rotation signal generators.

8. The dual encoder according to claim 1, wherein the second shaft is mounted in the housing so as to be axially adjustable in the direction of its longitudinal axis between a rest position and a switched position, the dual encoder further comprising a switching sensor associated with the housing that senses the rest position or switched position of the axially adjustable second shaft.

9. The dual encoder according to claim 8,
wherein the switching sensor is a noncontact sensor, wherein the adjusting movements of the axially adjustable second shaft can be detected indirectly or directly.

10. The dual encoder according to claim 9,
further comprising
a signaling disk being fastened to the axially adjustable second shaft, wherein the adjusting movements of the signaling disk can be detected in a noncontact fashion with the aid of the switching sensor.

11. The dual encoder according to claim 8,
wherein
the axially adjustable second shaft is held in its rest position by a readjusting magnet.

12. The dual encoder according to claim 8,
wherein
the adjusting movements of the axially adjustable shaft between the rest position and the switched position are dampened with the aid of at least one dampening element.

13. A control panel of a lighting control console is fitted with the dual encoder of claim 1.

14. The dual encoder according to claim 13,
wherein
the activation elements are rotary elements for hand-activated adjustment of the first shaft and second shaft, the rotary elements arranged one on top of the other in the control panel of the lighting control console in the direction of the longitudinal axis of the first shaft and second shaft.

15. The dual encoder according to claim 13,
further comprising
a weight is fastened to at least one activation element.

16. The dual encoder according to claim 1 wherein
the at least one magnet of the locking mechanism is a permanent magnet.

17. The dual encoder according to claim 1 wherein
the at least one magnet of the locking mechanism is an electromagnet.

18. The dual encoder according to claim 1, wherein the at least one first rotational signal generator and at least one second rotational signal generator works in a noncontact fashion, in particular as Hall effect sensors, wherein the adjusting movements of the radial extensions at the locking rings, for generating the switchover signal between two locking positions, can be detected with the aid of the rotation signal generator that works in a noncontact fashion.

* * * * *